United States Patent
Manley

[11] Patent Number: 6,154,304
[45] Date of Patent: Nov. 28, 2000

[54] MONITORING DISTORTION OF A SPINNING MIRROR

[75] Inventor: George Charles Manley, Herts, United Kingdom

[73] Assignee: Fujifilm Electronic Imaging Ltd., Herts, United Kingdom

[21] Appl. No.: 09/284,738
[22] PCT Filed: Sep. 4, 1997
[86] PCT No.: PCT/GB97/02381
    § 371 Date: Jun. 18, 1999
    § 102(e) Date: Jun. 18, 1999
[87] PCT Pub. No.: WO99/12000
    PCT Pub. Date: Mar. 11, 1999
[51] Int. Cl.[7] .................................................. G02B 26/08
[52] U.S. Cl. .......................... 359/212; 359/223; 359/226; 359/900; 250/236
[58] Field of Search ..................... 359/196–226, 359/900; 250/234–236

[56] References Cited

U.S. PATENT DOCUMENTS

| | | | |
|---|---|---|---|
| 3,743,427 | 7/1973 | Weiser | 356/124 |
| 5,535,042 | 7/1996 | Takada | 359/212 |

FOREIGN PATENT DOCUMENTS

1 598 648   9/1981   United Kingdom .

*Primary Examiner*—James Phan
*Attorney, Agent, or Firm*—Sughrue, Mion, Zinn, Macpeak & Seas, PLLC

[57] ABSTRACT

A method of monitoring distortion in a reflective surface of a spinning mirror, the method being constituted by (1) spinning the mirror; (2) directing a beam of radiation onto the reflective surface of the spinning mirror to generate a reflected beam; (3) positioning a radiation detector in the path of the reflected beam, whereby the radiation detector generates an electrical signal responsive to the shape of the reflected beam; and (4) monitoring the shape of the reflected beam by monitoring the electrical signal generated by the radiation detector.

18 Claims, 12 Drawing Sheets

MONITORING DISTORTION OF A SPINNING MIRROR

The present invention relates to a method and apparatus for monitoring distortion in a reflective surface of a spinning mirror.

Figure 1:
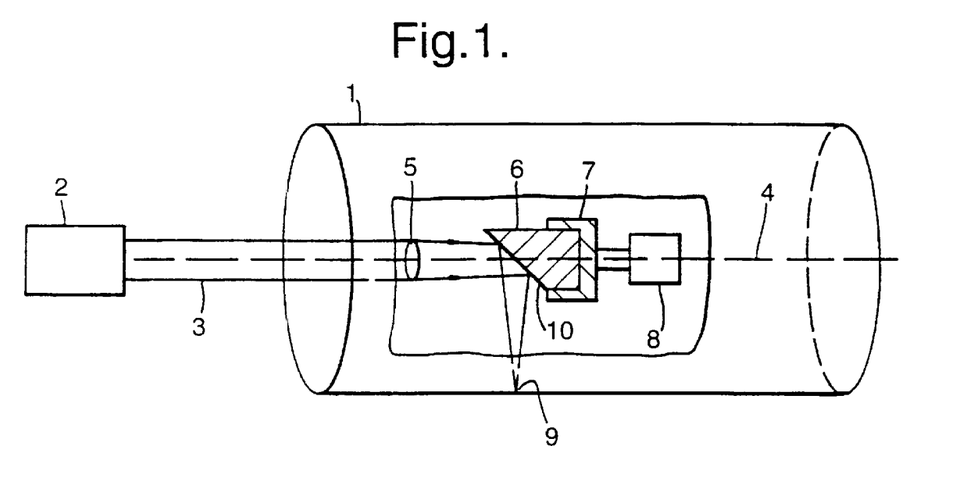
FIG. 1 illustrates a conventional imagesetter.

FIG. 1 illustrates a conventional imagesetter. A drum 1 carries a film to be exposed (not shown) on its inner surface. A laser 2 generates a collimated laser beam 3 which is directed along the axis 4 of the drum 1. The laser beam 3 is reflected by a spinning mirror 6 onto the film. The beam 3 is focused into a spot 9 by a focusing lens 5. The rotating mirror 6 is typically a beryllium mirror which is mounted in a mirror mounting 7 and spun at approximately 30,000 rpm by a drive 8. As the film is exposed, items 5–8 are driven along the axis 4 of the drum 1. Thus the spot 9 follows a series of azimuthal scan lines across the film. The geometry of the system illustrated in FIG. 1 defines an axis parallel to the axis 4 of the drum 1 and perpendicular to the scan lines, which is referred to hereinafter as the X-axis. Similarly the geometry of the system illustrated in FIG. 1 defines an azimuthal direction, substantially parallel with the scan lines, which is referred to hereinafter as the Y-axis.

Due to the high speed of rotation of the spinning mirror 6, centrifugal force tends to distort the reflecting surface 10 of the mirror. This creates an undesirable effect known as dynamic astigmatism which will now be explained with reference to FIGS. 2–4.

Figure 2:
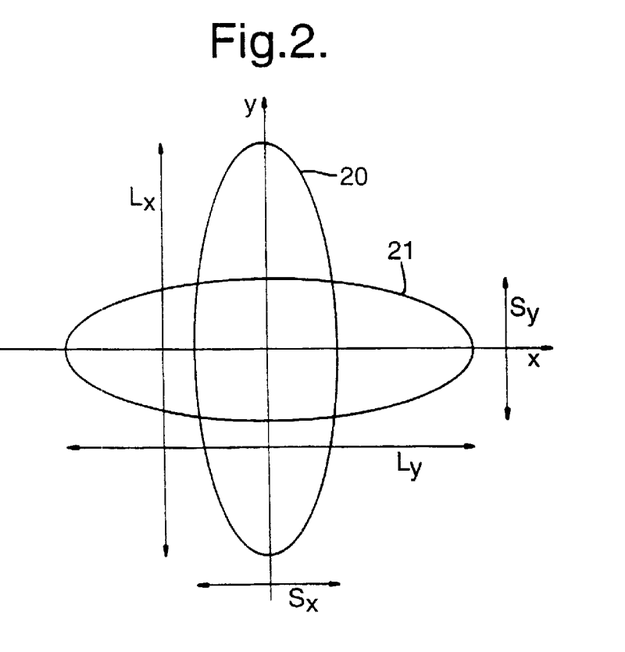
FIG. 2 illustrates the effect of dynamic astigmatism.

In an ideal case, where the spot 9 is precisely focused on the interior of the drum 1, and no dynamic astigmatism is present, the spot 9 will be perfectly circular (on the assumption that the incident beam 3 is perfectly circular and perfectly collimated). The presence of dynamic astigmatism in the spinning mirror 6 causes the spot 9 to deviate from its ideal circular form. This deviation is illustrated in FIG. 2. FIG. 2 illustrates the profile of the scanning dot 9 on the interior of the drum 1 with the lens 5 at two different focal positions and when dynamic astigmatism is present. The X and Y axes are as previously defined. Contour 20 is the contour of 50% beam intensity at the interior surface of the drum with the focusing lens 5 in a first axial position $f_x$ (referred to hereinafter as the horizontal focus position). When the lens 5 is in the horizontal focus position, the horizontal dimension (ie. in the X direction) of the spot 9 at the interior surface of the drum is at a minimum. The contour 20 is an ellipse having a maximum dimension $L_x$ and a minimum dimension $S_x$. As the lens 5 is moved to a second axial position $f_y$ (referred to hereinafter as the vertical focus position) the profile of the spot 9 at the interior surface of the drum changes to give the 50% contour indicated at 21. When the lens 5 is in the vertical focus position, the vertical dimension (ie. in the Y direction) of the spot 9 is at a minimum. The contour 21 is an ellipse having a maximum dimension $L_y$ and a minimum dimension $S_y$.

At an intermediate focal position between $f_x$ and $f_y$, the 50% contour will be circular with a diameter greater than $S_y$ and greater than $S_x$. Ideally the focal position of the lens 5 is set in the imagesetter at this intermediate position, and ideally the diameter of the spot in this focal position is as small as possible. However if the mirror 6 suffers from a significant amount of dynamic astigmatism, the diameter of the spot 9 with the lens in the intermediate focus position may be unacceptably large. Therefore if the dynamic astigmatism is too high the mirror should not be used. Dynamic astigmatism can vary widely between different mirrors 6.

Figure 3A:
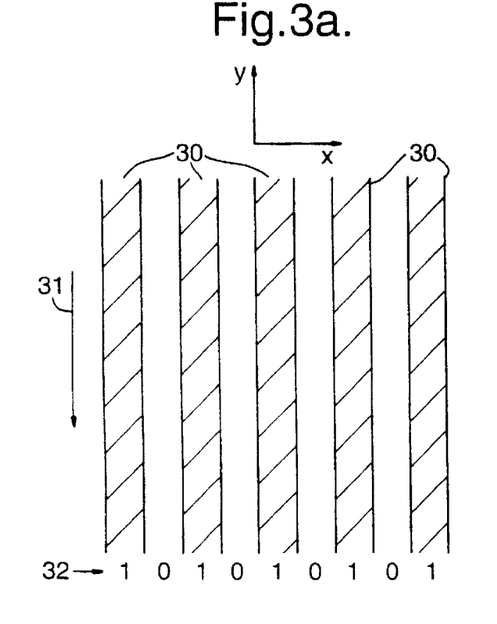
FIGS. 3 and 4 illustrate a conventional method of monitoring dynamic astigmatism.
Figure 3B:
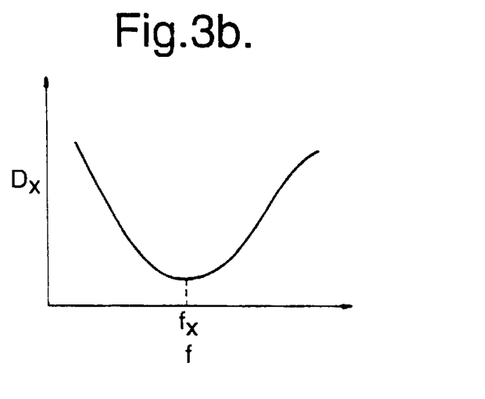
Figure 4A:
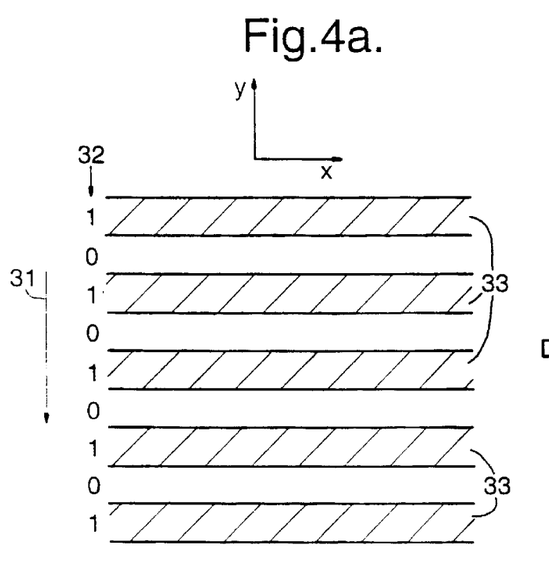
Figure 4B:
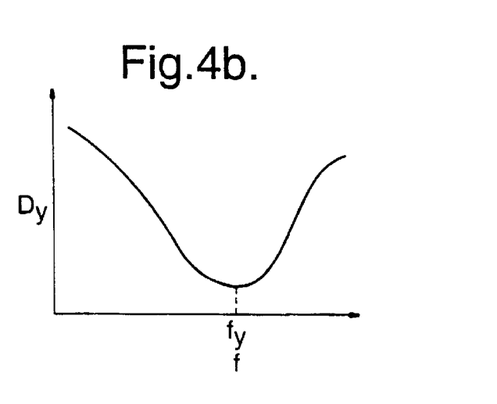

It is clear that in the manufacture of the apparatus illustrated in FIG. 1 (or other imaging systems which use a spinning mirror, such as input scanners), it is desirable to measure the degree of dynamic astigmatism created by the spinning mirror 6. It is not sufficient to measure the astigmatic properties of a static (i.e. non-spinning) mirror since centrifugal forces can dramatically distort the mirror in use. A conventional method of measuring dynamic astigmatism will now be described with reference to FIGS. 3 and 4. A film is mounted on the internal surface of the drum 1, and a series of pixel wide vertical lines 30 (FIG. 3a) and horizontal lines 33 (FIG. 4A) are exposed on the film. The pixel values for each line are indicated at 32 and the scan direction is indicated at 31. The axial position of the focusing lens 5 is incremented between each adjacent line 30,33. The film is then removed, developed and inspected. When the lens 5 is in the horizontal focus position $f_x$ (corresponding with contour 20), then the width of the vertical lines 30 will be at a minimum. A densitometer is moved across the vertical lines 30 in the X-direction, and the optical density $D_x$ output by the densitometer varies across the film as illustrated in FIG. 3b, with a minimum at the horizontal focus position $f_x$. The position on the film (corresponding with the horizontal focus position $f_x$) is noted. The densitometer is then moved across the horizontal lines 33 in the Y-direction, and the output $D_y$ of the densitometer varies as illustrated in FIG. 4b, with a minimum at the vertical focus position $f_y$.

If the difference $f_x - f_y$ is unacceptably high, then the spinning mirror 6 has unacceptably high dynamic astigmatism and it is discarded.

The conventional method of measuring dynamic astigmatism described above is particularly complex since an entire imagesetter system must be set up before a mirror can be tested. In addition, the process of mounting, exposing, removing, developing and inspecting a film is very time consuming.

In accordance with a first aspect of the present invention there is provided a method of monitoring distortion in a reflective surface of a spinning mirror, the method comprising (1) spinning the mirror;

(2) directing a beam of radiation onto the reflective surface of the spinning mirror to generate a reflected beam;

(3) positioning a radiation detector in the path of the reflected beam, whereby the radiation detector generates an electrical signal responsive to the shape of the reflected beam; and (4) monitoring the shape of the reflected beam by monitoring the electrical signal generated by the radiation detector.

In accordance with a second aspect of the present invention there is provided apparatus for monitoring distortion in a reflective surface of a spinning mirror, the apparatus comprising (1) a mirror drive for spinning the mirror;

(2) a radiation emitter for directing a beam of radiation in use onto the reflective surface of the spinning mirror to generate a reflected beam;

(3) a radiation detector positioned in use in the path of the reflected beam, whereby the radiation detector generates an electrical signal responsive to the shape of the reflected beam; and (4) means for monitoring the shape of the reflected beam by monitoring the electrical signal generated by the radiation detector.

The present invention directly monitors the shape of the reflected beam using a radiation detector, which is indicative of any distortion in the reflective surface of the spinning mirror. The method is significantly quicker, simpler and more accurate than the conventional method which has to expose an entire film which is then inspected.

The radiation detector may comprises a 2D CCD array which is arranged with a plurality of imaging elements in the path of the reflected beam and which generates an image of the reflected beam. The image can then be analysed to determine the degree of distortion of the spinning mirror. For instance if the image is an ellipse the lengths of the minor and major axes of the ellipse can be compared. However if the reflected beam is focused to a small spot it may not be possible to directly resolve the shape of the spot as it moves past the radiation detector.

Therefore in a preferred example steps (3) and (4) comprise (a) positioning an aperture in front of the radiation detector in the path of the reflected beam whereby the detector detects pulses of radiation from the reflected beam which pass through the aperture; and (b) monitoring a characteristic of the detected radiation pulses.

This provides a simple and accurate method of indirectly monitoring the shape of the reflected beam. For instance the aperture may be suitably shaped and dimensioned such that the radiation pulses are responsive to the shape of the reflected beam. For instance the rise time or maximum intensity of the radiation pulses may be measured. Alternatively the aperture may be moved across the path of the reflected beam and the width of the beam can be measured by monitoring the distance over which a signal is present. Typically the aperture has a minimum dimension which is smaller than a maximum dimension of the reflected beam when focused in the plane of the aperture. Most preferably the aperture has a minimum dimension less than a minimum dimension of the reflected beam when focused in the plane of the aperture. In one example the illuminated area has a minimum dimension of approximately 10–12 $\mu$m and the aperture has a minimum dimension less than 10–12 $\mu$m (typically 3–4 $\mu$m).

Preferably step (b) comprises (i) positioning a focusing optic in the path of the beam or the reflected beam;

(ii) varying and monitoring the optical distance between the focusing optic and the radiation detector;

(iii) detecting a horizontal focal point and a vertical focal point by monitoring variations in the electrical signal as the optical distance between the focusing optic and the radiation detector is varied; and (iv) determining a distortion value in accordance with the detected horizontal and vertical focal points.

For instance step (iv) may comprise calculating the difference or the ratio between the horizontal and vertical focal points. This provides a particularly accurate method of monitoring dynamic astigmatism.

Preferably the beam of radiation which is directed onto the reflective surface is substantially collimated.

A number of characteristics of the detected radiation pulses may be detected, including rise time, peak intensity and pulse duration.

The horizontal and/or vertical focal points are advantageously detected by detecting maxima and/or minima in the monitored characteristic.

The aperture may be square or circular but preferably the aperture comprises a slit. Typically the reflected beam illuminates an area in the plane of the slit, and the slit has a minimum dimension which is less than the maximum dimension of the illuminated area.

Where a slit is used, the vertical and horizontal focal points may be detected with the slit in horizontal and vertical orientations respectively.

The optical distance between the focusing optic and the radiation detector may be adjusted by varying the optical power of the focusing optic, or by varying the relative positions of the focusing optic and the aperture.

In accordance with a third aspect of the present invention there is provided a screen for use in apparatus according to the second aspect of the present invention, the screen comprising a pair of non-parallel slits.

Typically the slits are arranged substantially at right angles to each other. The slits may be arranged in a cross-shape or in a T-shape.

A number of embodiments of the present invention will now be described with reference to the accompanying drawings, in which.

Figure 5:
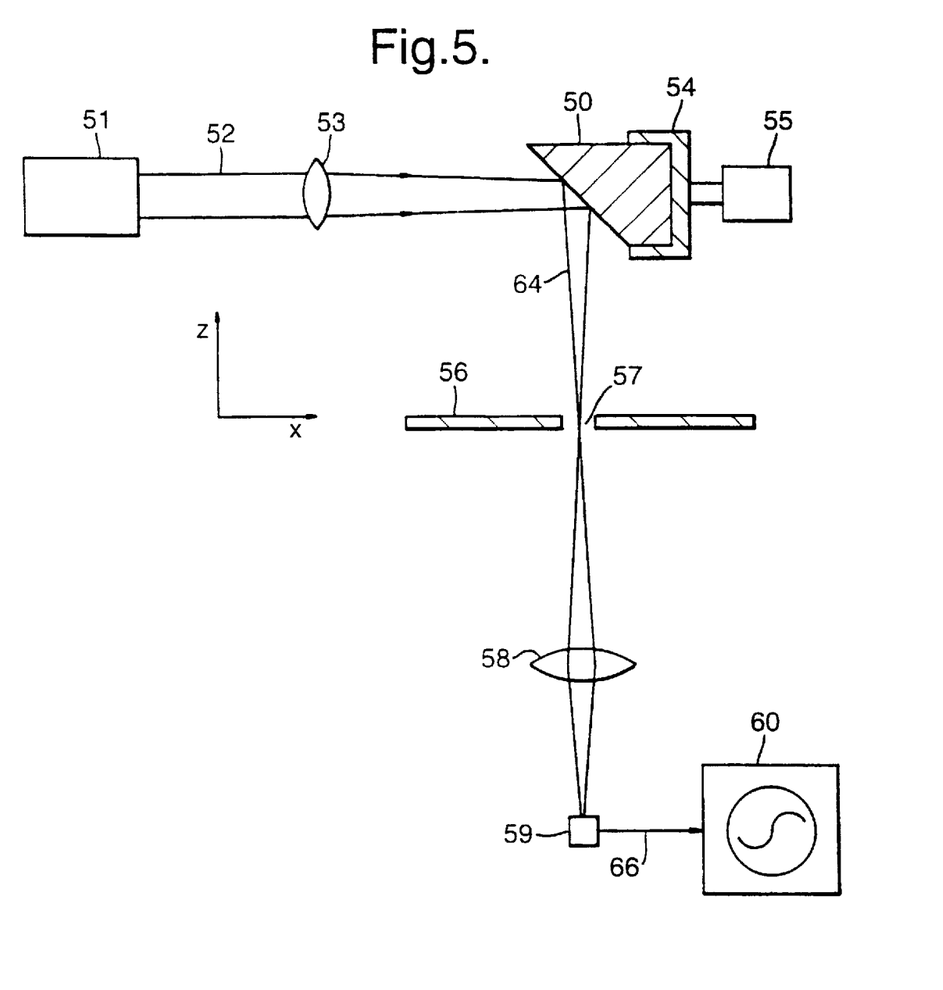
FIG. 5 illustrates an example of apparatus according to the second aspect of the present invention.

Referring to FIG. 5, a test rig for testing the astigmatic properties of a spinning mirror 50 is illustrated, comprising a laser 51 which generates a collimated laser beam 52, a focusing lens 53, a mirror mounting 54 driven by a motor 55, a screen 56 with a slit 57, a lens 58, a photodetector 59 and an oscilloscope 60. The screen 56 is located at the approximate focal point of the lens 53, i.e. the screen 56 is located at the same position as the interior of the rotating drum 1 (FIG. 1). The mirror 50 under test is illuminated by the beam 52 across its entire area: this gives a minimum diameter of the focused beam in the plane of the screen 56 (the larger the collimated screen the smaller the spot).

Figure 6:
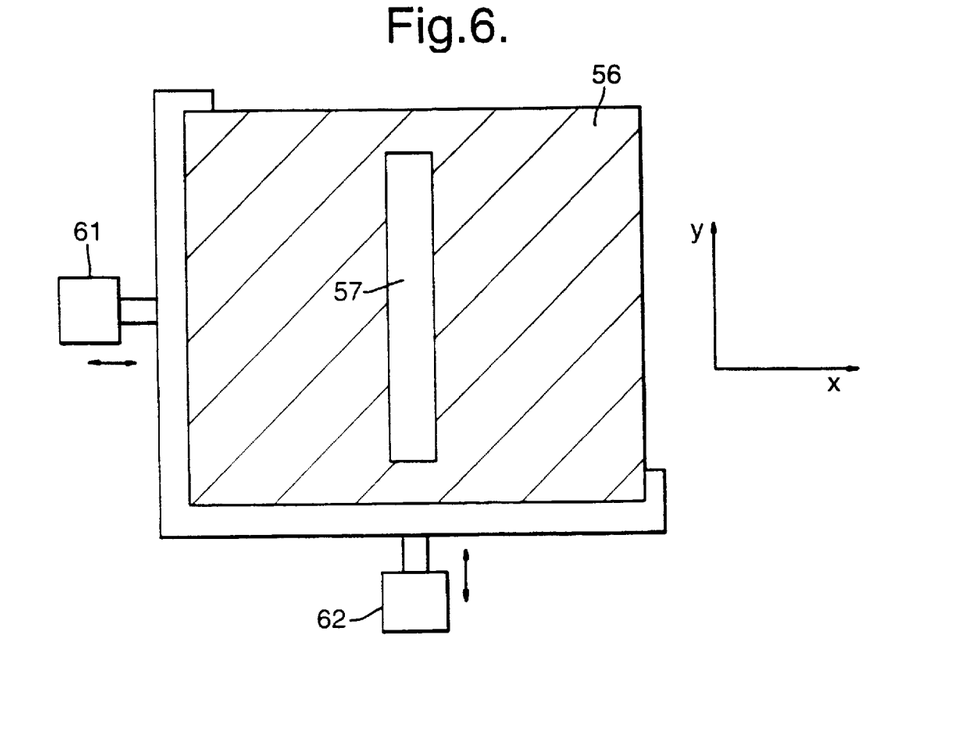
FIG. 6 is a plan view of the screen and slit shown in FIG. 5.

FIG. 6 is a plan view of the screen 56. The rectangular slit 57 has a length in the range 50–100 $\mu$m and a width in the range 3–4 μm. These values are chosen so that the width of the slit is approximately 30–50% of the minimum width of the beam in the plane of the slit 57, and so that the length of the slit is much greater than its width, giving sufficient discrimination between vertical and horizontal focus points. The width of the slit may be increased up to a maximum width which must be less than the maximum width of the focused beam (i.e. less than the long dimensions $L_x, L_y$ of the spot 9 in FIG. 2). The photodetector 59 has a sensitive area of approximately ¼ mm diameter and has a uniform response across the sensitive area. The lens 58 is arranged such that photodetector receives light from an area with a diameter greater than the length of the slit 57. Therefore the photodetector 59 effectively integrates the intensity of the reflected light passing through the slit 57. The position of the screen 56 can be altered by an X micrometer 61 and a Y micrometer 62. A method of monitoring the distortion in the reflective surface of the mirror 50 is described below with reference to FIGS. 7 to 9.

Figures 7A, 7B:
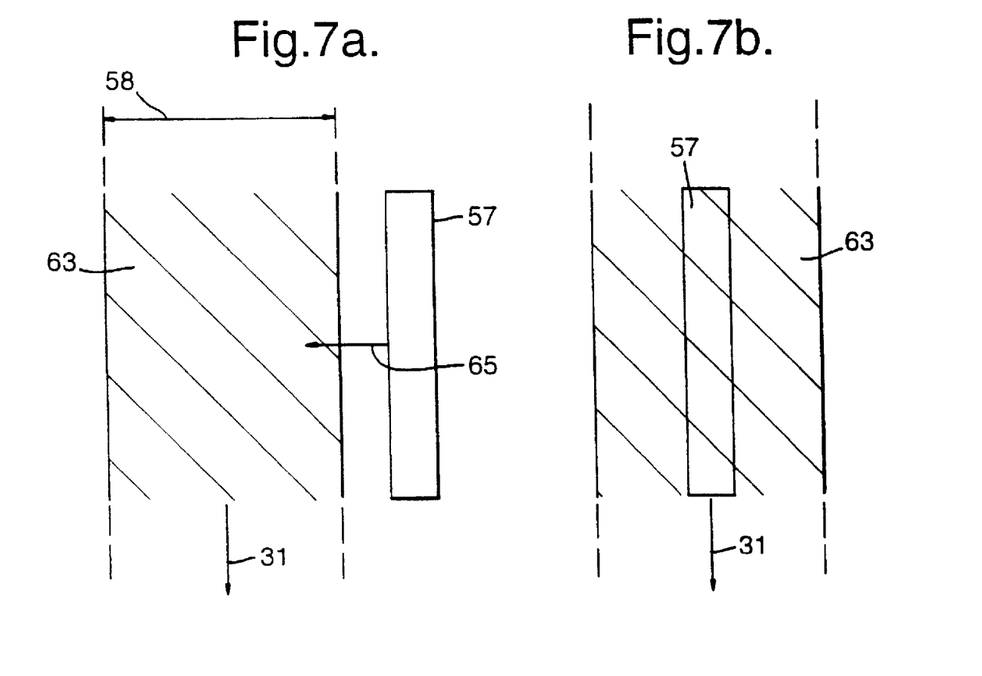
FIG. 7 illustrates alignment of the reflected beam with the slit.

With the slit 57 aligned vertically (as shown in FIG. 6—see step 80), the beam sweeps out a path indicated at 63 in FIG. 7. The beam has a width 58 having a maximum which is determined by the degree of astigmatism in the mirror 50, and a minimum (corresponding with the horizontal focus position) of the order of 10–12 μm (corresponding with a scanning resolution of 100 lines per mm). Initially, the beam is not aligned with the slit 57 (as illustrated in FIG. 7a), and therefore the photodetector 59 detects no light. The X micrometer 61 is adjusted (step 81) to move the slit 57 as illustrated at 65 until the slit 57 is positioned in the centre of the beam path 63, as illustrated in FIG. 7b. In this position, the peak intensity of the light pulses received by the photodetector 59 are at a maximum (step 82). By adjusting the X micrometer 61 until the amplitude of the signal on oscilloscope 60 is at a maximum, the X position of the slot can be adjusted until the slot 57 is approximately at the centre of the beam path 63.

Figure 10:
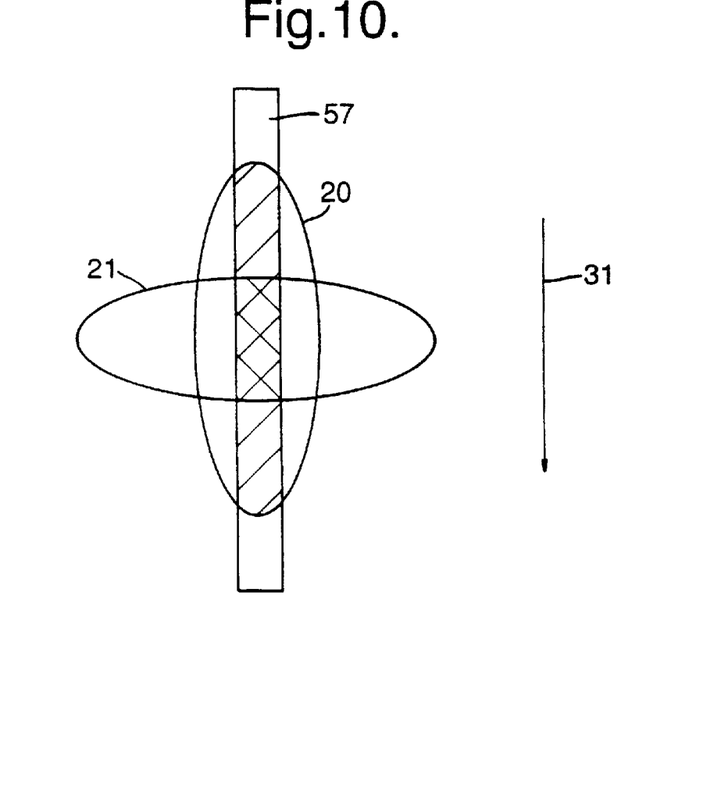
FIG. 10 shows spot profiles superimposed on a vertically aligned slit.
Figure 11:
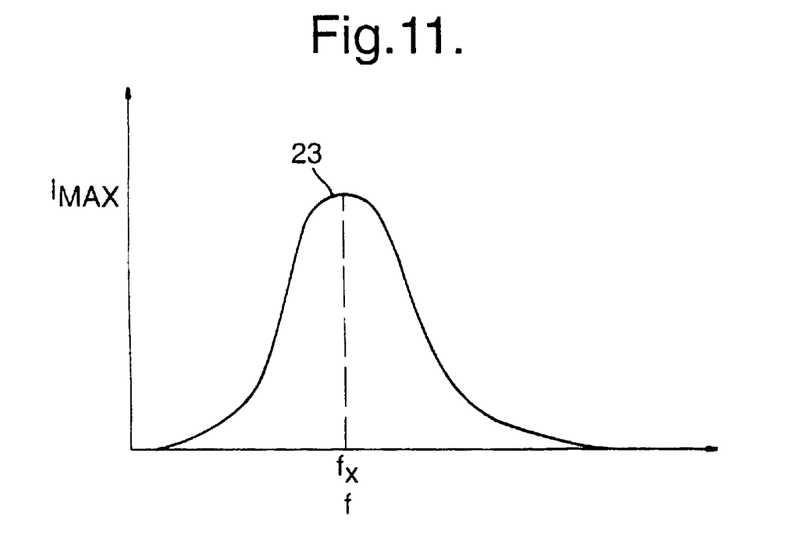
FIG. 11 illustrates the variation in peak intensity with the position of the lens and the slit vertically aligned.

The axial position of the lens 53 is then adjusted (step 83). This has the effect illustrated in FIGS. 10 and 11. With the lens 53 in the horizontal focus position $f_x$, the peak light intensity $I_{MAX}$ passing through the slit 57 is at a maximum 23, shown in FIG. 11 (corresponding with contour 20 shown in FIG. 10). By monitoring the signal on oscilloscope 60 to determine the position of the maximum 23, the focal position $f_x$ can be approximately determined (step 84).

Figure 8:
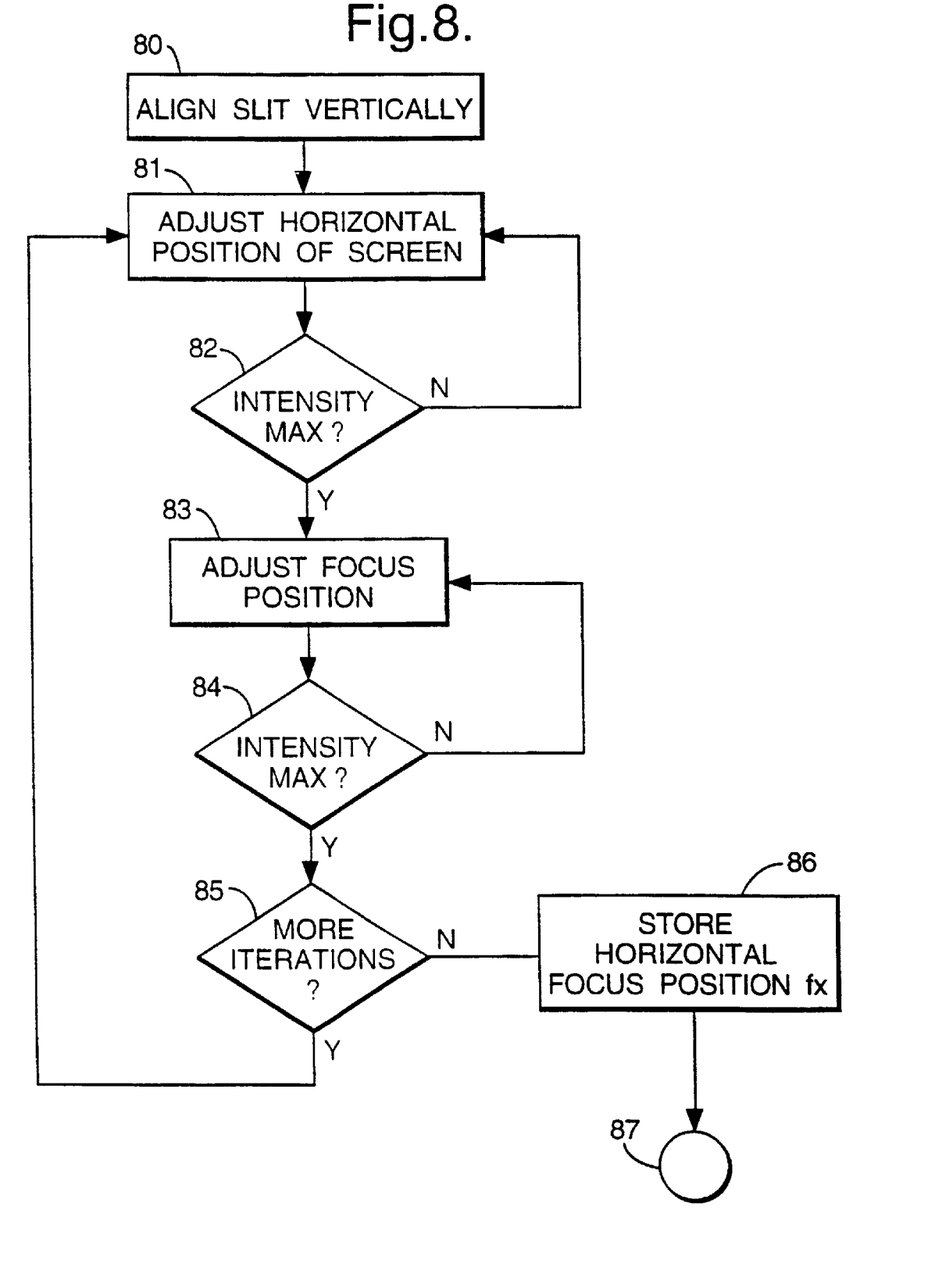
FIGS. 8 and 9 are a flow diagram illustrating an example of a method according to the first aspect of the present invention.
Figure 9:
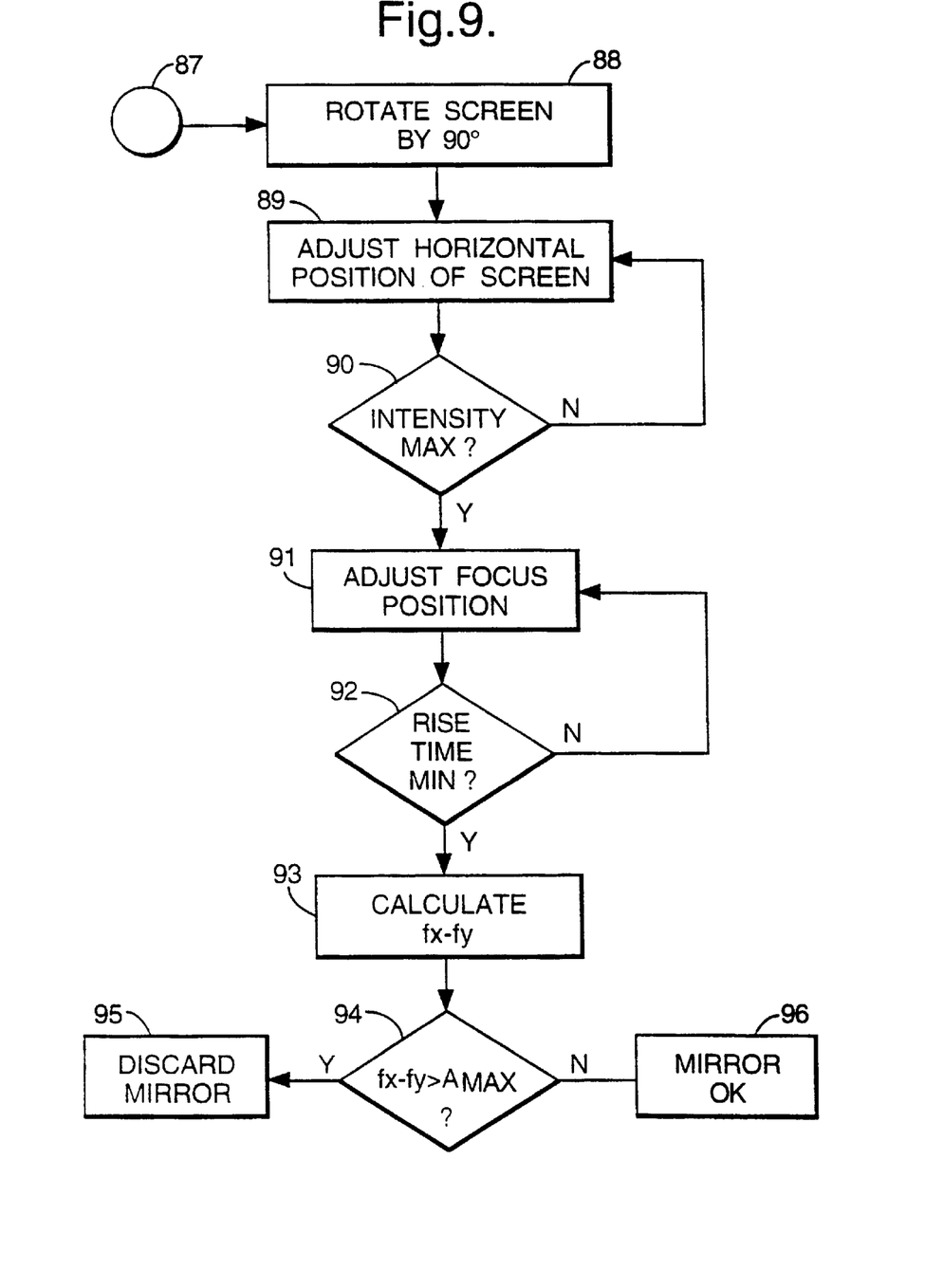

If greater accuracy is required, then further iterations of steps 81–84 can be repeated, as indicated at step 85. The horizontal focus position $f_x$ is stored at step 86.

Figure 12:
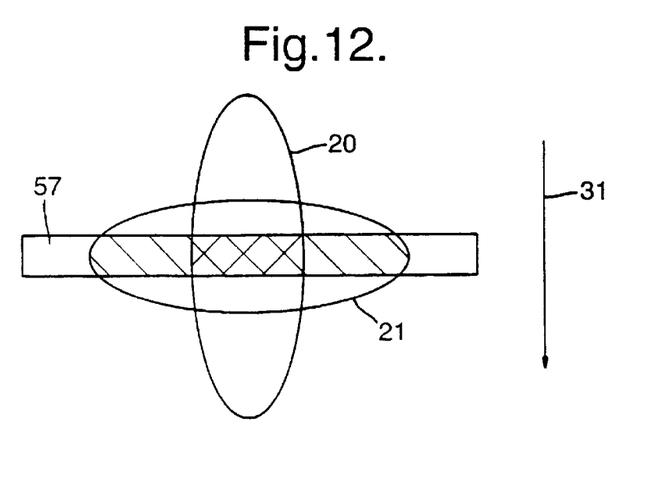
FIG. 12 shows spot profiles superimposed on a horizontally aligned slit.

The screen 56 is then rotated by 90° (step 88) so that the slit 57 lies horizontally as illustrated in FIG. 12. If necessary, the horizontal position of the screen is adjusted using micrometer 61 (step 89) until the peak intensity $I_{MAX}$ is at a maximum (step 90). The focus position is then adjusted (step 91). In this case, the maximum amount of light passing through to photodetector 59 occurs when the lens 5 is in its vertical focus position, corresponding with contour 21 shown in FIG. 12. The vertical focus position $f_y$ can be detected in the same way as the horizontal focus position, ie. by detecting a maximum in the peak pulse intensity $I_{MAX}$ received by the photodetector 59. However preferably the rise time of the signal on output line 66 is monitored, as discussed below.

Figure 13:
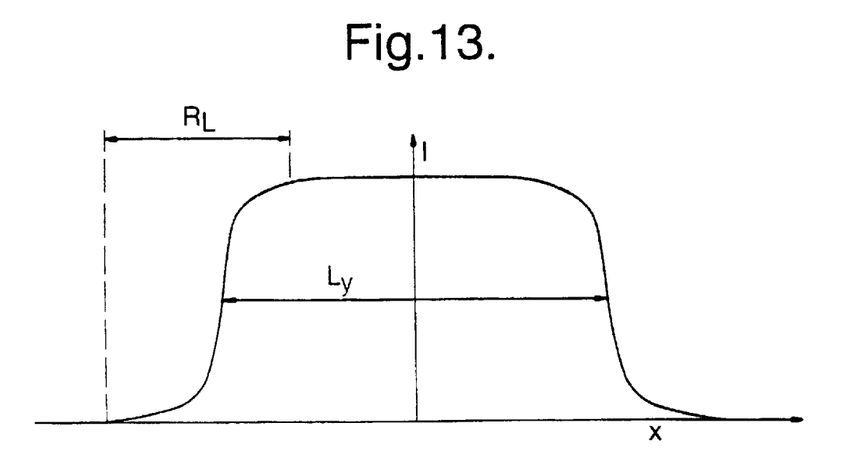
FIGS. 13 and 14 show the beam intensity across the focused spot in the horizontal and vertical directions.
Figure 14:
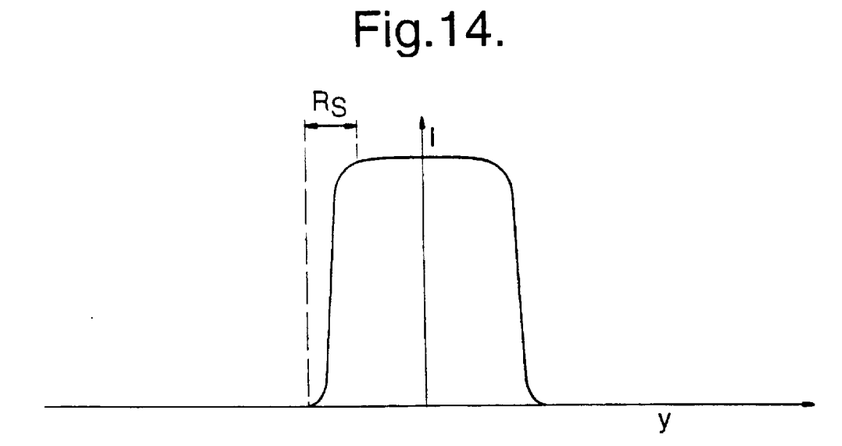

FIG. 13 is a graph of the intensity I of the light spot 9 along the X-axis when the lens 5 is in the vertical focal position (corresponding with contour 21). The spot has a length $L_y$ and a rise distance $R_L$. FIG. 14 is a graph of variation across the same contour 21 along the Y-axis. The maximum intensity is the same, but the width of the spot is $S_y$ and the rise distance is $R_s$. As can be seen, $R_L$ is greater than $R_s$. This feature is exploited in measuring the vertical focus position.

Figure 15:
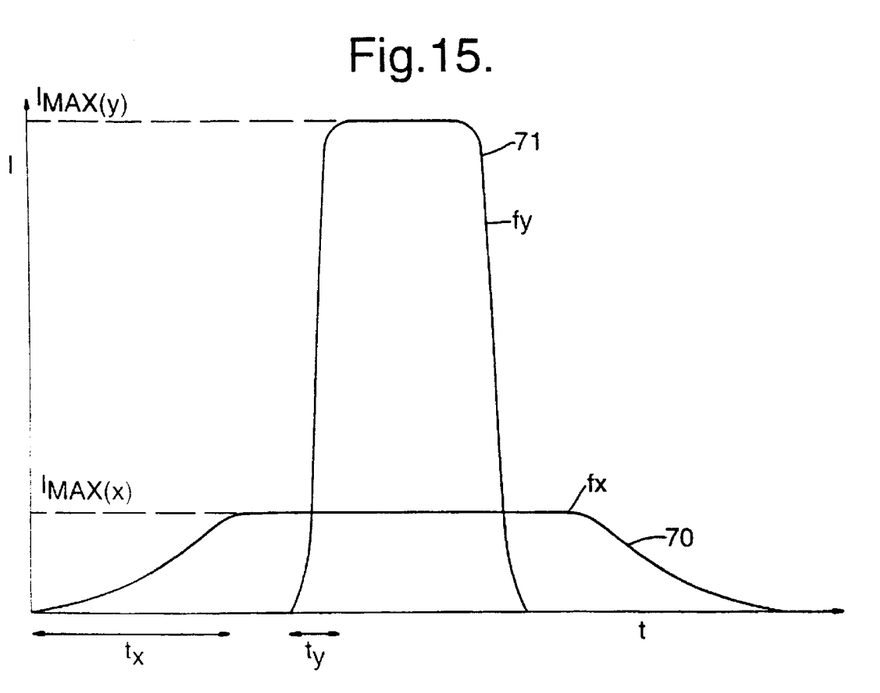
FIG. 15 shows pulses with the lens in the vertical and horizontal focus positions, and the slit horizontally aligned.

FIG. 15 is a graph illustrating the variation in the intensity I of light with respect to time t received by photodetector 59 during a single pulse, with the slit 57 arranged horizontally as shown in FIG. 12. With the lens 5 in the horizontal focus position $f_x$ (corresponding with contour 20) the signal is as illustrated at 70, with a high rise time $t_x$ (corresponding with $R_L$). With the lens 5 in the vertical focus position $f_y$, the signal is as illustrated at 71, with a short rise time $t_y$ (corresponding with $R_s$). By detecting a minimum in the rise time (step 92), the vertical focus position $f_y$ is be determined.

The difference $(f_x-f_y)$ between the axial positions of the lens 5 in the horizontal and vertical focus positions is then determined at 93. If this is greater than a predetermined maximum distortion value $A_{max}$ (step 94) then the mirror 50 is discarded at 95. Otherwise the mirror is acceptable (step 96) for inclusion in an imaging device.

Figure 16:
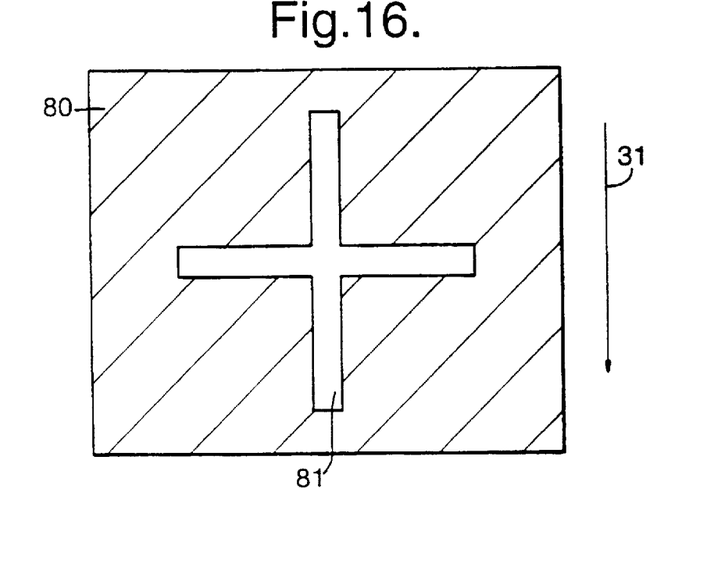
FIG. 16 is a plan view of a first screen according to the third aspect of the present invention.

FIG. 16 illustrates an alternative screen 80 to replace the screen 56. The screen 80 has a cross-shaped aperture 81. This enables the vertical and horizontal focus positions to be determined without having to rotate the screen between two positions.

Figure 17:
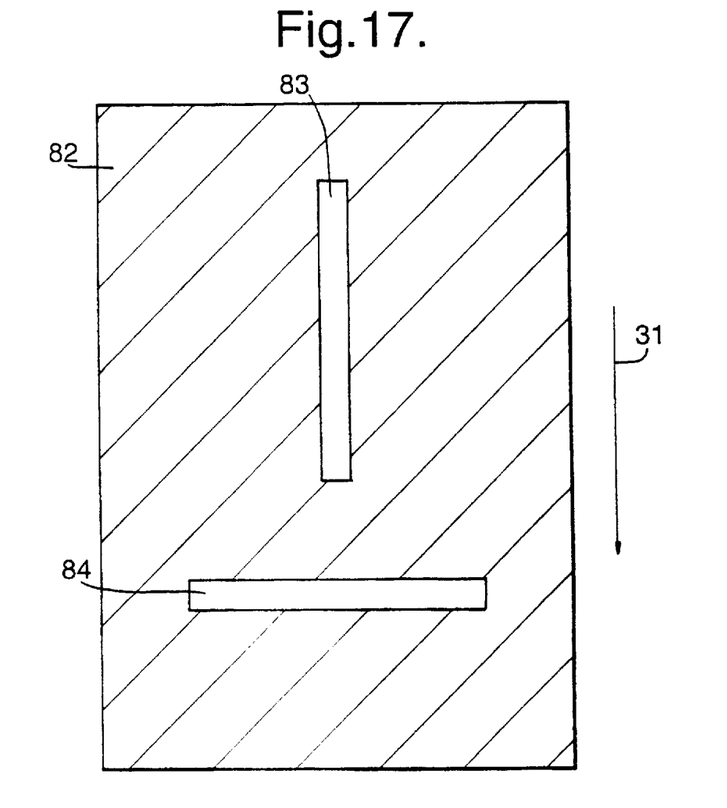
FIG. 17 is a plan view of a second screen according to the third aspect of the present invention.

FIG. 17 illustrates a further alternative screen 82 with a pair of horizontal and vertical slits 83,84 arranged at right angles in a T-shaped configuration. Once the scan lines are centralised with respect to the vertical slit 83, no further adjustment needs to be made to measure vertical focus using the slit 84.

The screens 80,82 may be used in a method corresponding with FIGS. 8 and 9 (without the requirement of step 88), ie. the pulses from the slits may be used to determine the horizontal and vertical focus positions. Alternatively the astigmatism may be monitored by comparing the relative peak intensities from the two slits, as described below with reference to FIGS. 18–20.

In a first step 100 (FIG. 20) the screen 82 is adjusted vertically until the beam is aligned with the vertical slit. This can be detected when a pair of pulses can be seen (step 101). The axial position of the lens 53 is then adjusted (step 102) until the difference in peak intensity between the pair of pulses is at a maximum.

Figure 18:
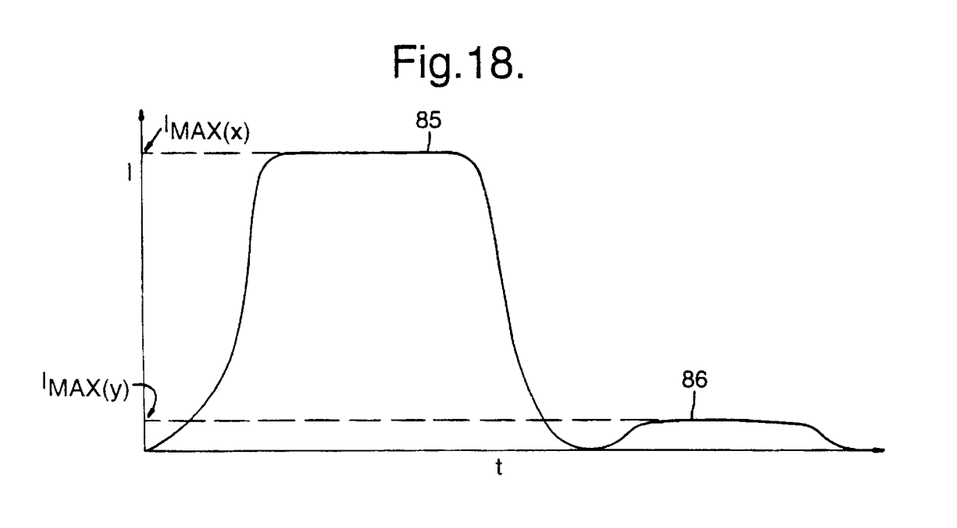
FIG. 18 illustrates a pair of pulses obtained from the screen of FIG. 17 with the lens in the horizontal focus position.

The signal received by the photodetector with the screen 82 of FIG. 17 and the lens in the horizontal focus position $f_x$ is illustrated in FIG. 18. The photodetector receives a first pulse 85 from the vertical slit and a second pulse 86 from the horizontal slit. The difference between the peak intensity $I_{max(x)}$ of the first pulse and the peak intensity $I_{max(y)}$ of the second pulse is at a maximum and the difference $I_{max(x)}-I_{max(y)}$ is indicative of the dynamic astigmatism.

Figure 19:
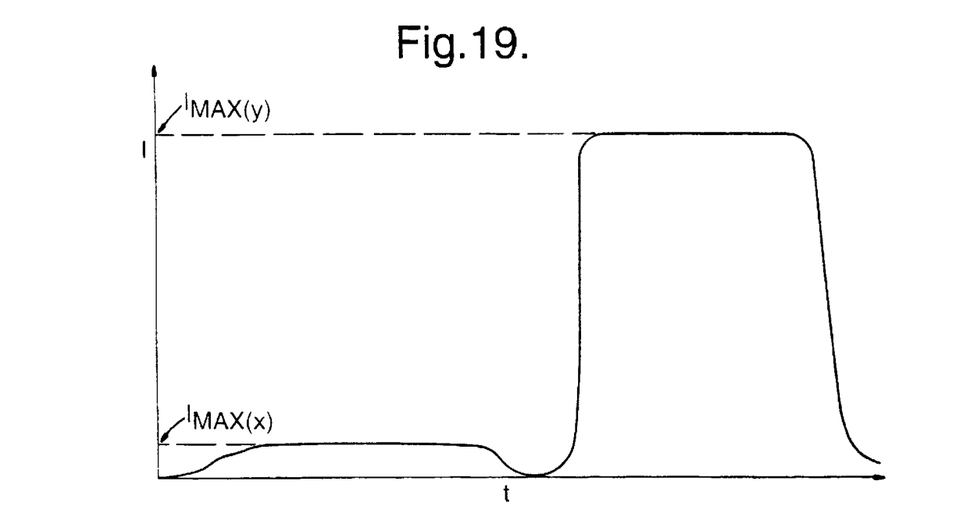
FIG. 19 illustrates a pair of pulses obtained from the screen of FIG. 17 with the lens in the vertical focus position.

FIG. 19 illustrates the signal with the lens 53 at the vertical focus position. In this case $I_{max(x)}-I_{max(y)}$ is at a minimum and is also indicative of the dynamic astigmatism.

Figure 20:
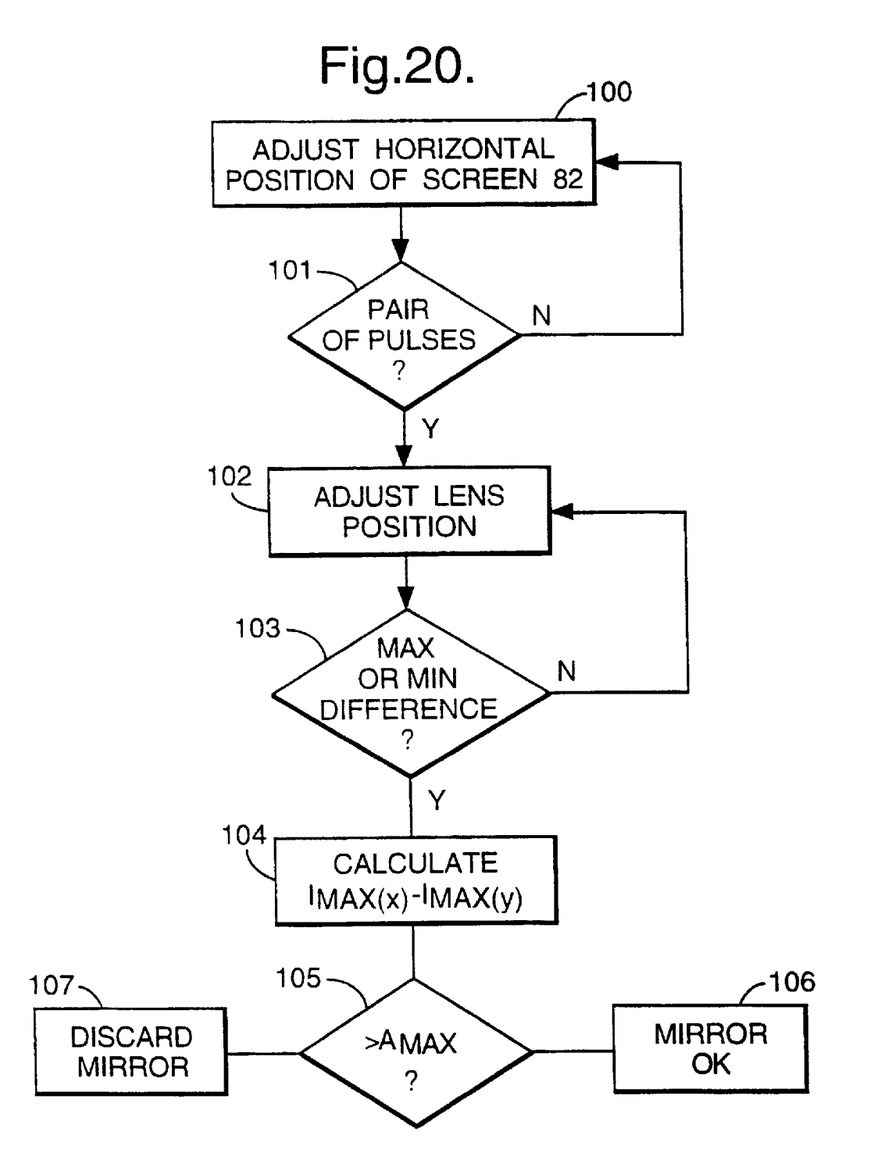
FIG. 20 is a flow diagram illustrating an example of measuring astigmatism using the screen shown in FIG. 17.

When the difference is at a maximum or minimum (step 103) the difference $I_{max(x)}-I_{max(y)}$ is calculated at 104 and used to determine whether the mirror is acceptable (steps 105–107).

What is claimed is:

1. A method of monitoring distortion in a reflective surface of a spinning mirror, the method comprising
   (1) spinning the mirror;
   (2) directing a beam of radiation onto the reflective surface of the spinning mirror to generate a reflected beam;
   (3) positioning a radiation detector in the path of the reflected beam, whereby the radiation detector generates an electrical signal responsive to the shape of the reflected beam; and (4) monitoring the shape of the reflected beam by monitoring the electrical signal generated by the radiation detector.

2. A method according to claim 1 wherein steps (3) and (4) comprise (a) positioning an aperture in front of the radiation detector in the path of the reflected beam whereby the detector detects pulses of radiation from the reflected beam which pass through the aperture; and (b) monitoring a characteristic of the detected radiation pulses.

3. A method according to claim 2 wherein the monitored characteristic comprises the rise time of the detected radiation pulses.

4. A method according to claim 2, wherein the monitored characteristic comprises the peak intensity of the detected radiation pulses.

5. A method according to claim 2 wherein the monitored characteristic comprises the pulse duration of the detected radiation pulses.

6. A method according to claim 2 wherein the aperture comprises a slit.

7. A method according to claim 6 wherein the reflected beam illuminates an area in the plane of the slit, and the slit has a minimum dimension which is less than a maximum dimension of the illuminated area when the reflected beam is focused on the slit.

8. A method according to claim 6 further comprising:

(i) positioning a focusing optic in the path of the beam or the reflected beam;

(ii) varying and monitoring the optical distance between the focusing optic and the radiation detector;

(iii) detecting a horizontal focal point with the slit vertically aligned and a vertical focal point with the slit horizontally aligned by monitoring variations in the electrical signal as the optical distance between the focusing optic and the radiation detector is varied; and (iv) determining a distortion value in accordance with the detected horizontal and vertical focal points.

9. A method according to claim 1 further comprising (i) positioning a focusing optic in the path of the beam or the reflected beam;

(ii) varying and monitoring the optical distance between the focusing optic and the radiation detector;

(iii) detecting a horizontal focal point and a vertical focal point by monitoring variations in the electrical signal as the optical distance between the focusing optic and the radiation detector is varied; and (iv) determining a distortion value in accordance with the detected horizontal and vertical focal points.

10. A method according to claim 9 wherein one of the horizontal and vertical focal points are detected by detecting one of maxima or minima in the monitored characteristic.

11. A method according to claim 9 wherein step (ii) comprises varying the relative positions of the focusing optic and the radiation detector.

12. Apparatus for monitoring distortion in a reflective surface of a spinning mirror, the apparatus comprising (1) a mirror drive for spinning the mirror;

(2) a radiation emitter for directing a beam of radiation in use onto the reflective surface of the spinning mirror to generate a reflected beam;

(3) a radiation detector positioned in use in the path of the reflected beam, whereby the radiation detector generates an electrical signal responsive to the shape of the reflected beam; and (4) means for monitoring the shape of the reflected beam by monitoring the electrical signal generated by the radiation detector.

13. Apparatus according to claim 12 further comprising (a) a focusing optic positioned in use in the path of the beam or the reflected beam; and (b) an aperture positioned in use in front of the radiation detector in the path of the reflected beam whereby the detector detects pulses of radiation from the reflected beam which pass through the aperture.

14. An apparatus according to claim 13, wherein the aperture comprises a pair of non-parallel slits.

15. An apparatus according to claim 14 wherein the slits are arranged substantially at right angles to each other.

16. An apparatus according to claim 14 wherein the slits are arranged in a cross-shape.

17. An apparatus screen according to claim 14 wherein the slits are arranged in a T-shape.

18. Apparatus according to claim 12, further comprising means for varying and monitoring the optical distance between the focusing optic and the radiation detector.

\* \* \* \* \*